United States Patent
Tang et al.

(10) Patent No.: US 11,739,261 B2
(45) Date of Patent: Aug. 29, 2023

(54) FLUORESCENT PROBES FOR ACID DETECTION

(71) Applicant: THE HONG KONG UNIVERSITY OF SCIENCE AND TECHNOLOGY, Hong Kong (CN)

(72) Inventors: Benzhong Tang, Hong Kong (CN); Xin Cai, Hong Kong (CN); Jianguo Wang, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 668 days.

(21) Appl. No.: 16/741,130

(22) Filed: Jan. 13, 2020

(65) Prior Publication Data

US 2020/0224091 A1    Jul. 16, 2020

Related U.S. Application Data

(60) Provisional application No. 62/918,057, filed on Jan. 15, 2019.

(51) Int. Cl.
*C09K 11/06* (2006.01)
*G01N 21/64* (2006.01)

(52) U.S. Cl.
CPC .............. *C09K 11/06* (2013.01); *G01N 21/64* (2013.01); *C09K 2211/1044* (2013.01)

(58) Field of Classification Search
CPC ...................................................... C09K 11/06
USPC ........................................................ 436/172
See application file for complete search history.

(56) References Cited

PUBLICATIONS

Fang et al. "Synthesis and biological evaluation of 1,2,4,5-tetrasubstituted imidazoles" Res Chem Intermed (2017) 43:4413-4421 (Year: 2017).*
Pusch et al. "A Photochemical One-Pot Three-Component Synthesis of Tetrasubstituted Imidazoles" Org. Lett. 2014, 16, 5430-5433 Downloaded via (Year: 2014).*

* cited by examiner

*Primary Examiner* — Christine T Mui
*Assistant Examiner* — Emily R. Berkeley
(74) *Attorney, Agent, or Firm* — Nath, Goldberg & Meyer; Joshua B. Goldberg

(57) ABSTRACT

A fluorescent compound for acid detection is strongly emissive in the solid state and can aggregate in the presence of an acid. As such, a fluorescent intensity emitted from the compound can be enhanced from an original intensity level in the presence of an acid. The fluorescent compound can emit an enhanced fluorescent intensity in the presence of an ultra-low acid concentration, for example, a concentration of at least about $10^{-20}$ M.

2 Claims, 5 Drawing Sheets

FIG. 2A
FIG. 2B
FIG. 2C
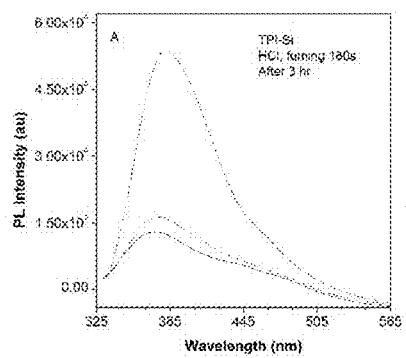
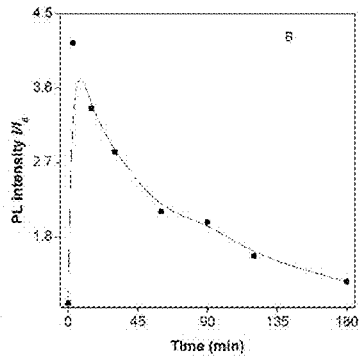
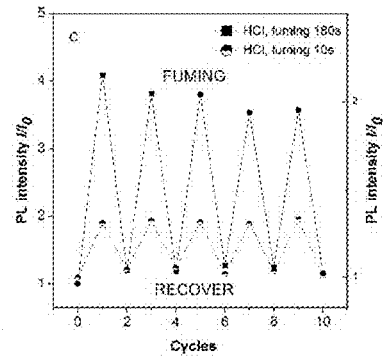
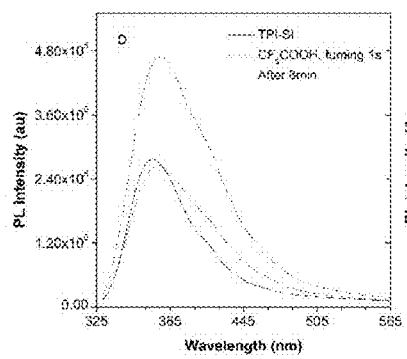
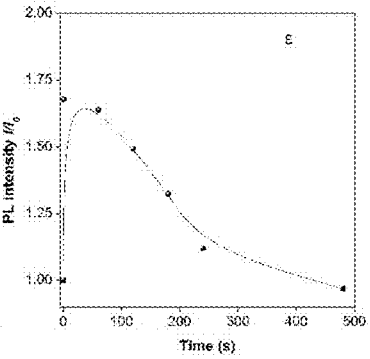
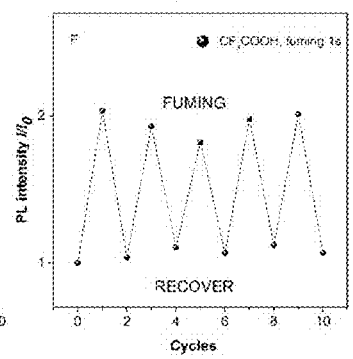
FIG. 2D
FIG. 2E
FIG. 2F
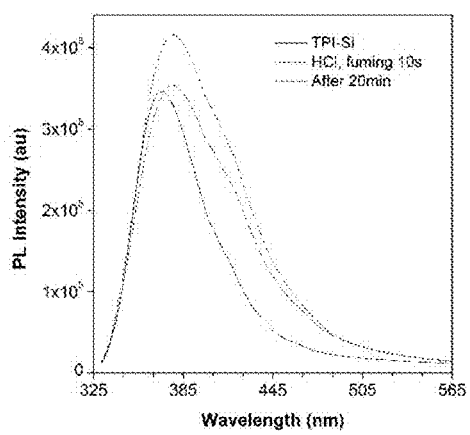
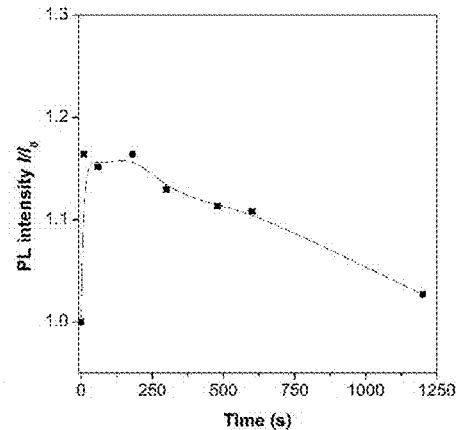
FIG. 3A
FIG. 3B

FLUORESCENT PROBES FOR ACID DETECTION

CROSS-REFERENCE

The present application claims priority to provisional U.S. Patent Application No. 62/918,057, filed Jan. 15, 2019, which was filed by the inventors hereof and is incorporated herein by reference in its entirety.

FIELD

The present subject matter relates generally to a series of compounds for fluorescent acid detection and their applications in functionalizing silicon substrate surfaces to provide tunable fluorescence with ultra-fast response.

BACKGROUND

Materials science has become a robust and interdisciplinary research field during the past decades. Many of the most pressing scientific problems currently faced by society are due to the limited availability of materials, e.g., ceramics, glass, metals, polymers, and composites, and a limited understanding of how to use materials in an efficient manner.

In addition to the chemical compositions of materials, the surfaces of materials must be considered to achieve optimal use of the materials. A material can be significantly affected by even a tiny change on its surface. In recent years, surfaces with desirable properties and tunable functionality, known as "smart surfaces," have been extensively researched. Smart surfaces, which are responsive to various changes or factors, such as, temperature, photon, electron, pH values, and solvent exposure, are important for a variety of applications, including intelligent devices, controllable separation of water and oil, and bio-detection. Generally, however, the responsiveness of these conventional surfaces is not as fast as needed or desired. Thus, smart surfaces with ultra-fast response, simple operation and good reversibility are highly desirable.

Accordingly, compounds for assisting in creation of such smart surfaces are highly desirable.

SUMMARY

A fluorescent compound for acid detection can sense or detect a presence of acid through aggregation, which induces fluorescence. The fluorescent compound is strongly emissive in the solid state. As such, a fluorescent intensity emitted from the compound can be enhanced from an original intensity level in the presence of an acid. The fluorescent compound can emit an enhanced fluorescent intensity in the presence of an ultra-low acid concentration, for example, a concentration of at least about $10^{-20}$ M in a short amount of time, e.g., within about 1 second to about 3 minutes.

According to an embodiment, a fluorescent compound for acid detection comprises the following backbone structure:

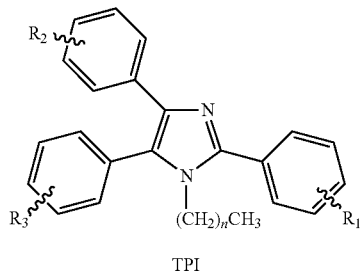

TPI wherein $R_1$ is selected from the group consisting of

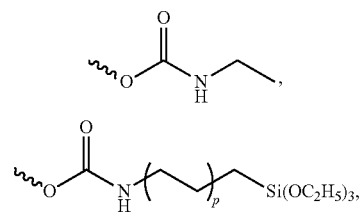

$-(CH_2)_nCH_3$, $-F$, $-Cl$, $-Br$, $-I$, $-COOH$, and $-CHO$;

wherein $R_2$ is selected from the group consisting of

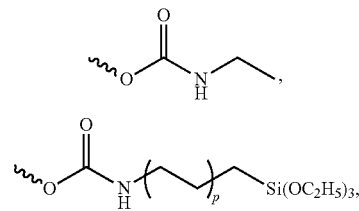

$-H$, $-(CH_2)_nCH_3$, $-F$, $-Cl$, $-Br$, $-I$, $-OH$, $-COOH$, and $-CHO$;

wherein $R_3$ is selected from the group consisting of

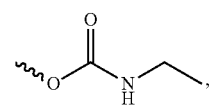

$-H$, $-(CH_2)_nCH_3$, $-F$, $-Cl$, $-Br$, $-I$, $-OH$, $-COOH$, and $-CHO$;

wherein n is an integer ranging from 0-100; and wherein p is an integer ranging from 1-100.

In some embodiments, $R_2$ and $R_3$ are the same. In some embodiments, $R_2$ is H and $R_3$ is H. In some embodiments, $R_2$ and $R_3$ are different.

In an embodiment, the compounds are selected from:

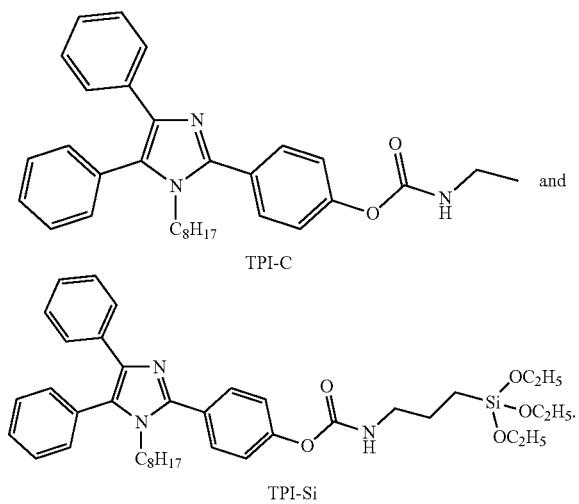

According to an embodiment, the present compounds can functionalize or modify a surface of a substrate to provide an AIE-gen functionalized surface (AIEFS). As described herein, the present compounds can self-assemble on the substrate surface to form a non-wettable, hydrophobic AIEFS. Contacting the AIEFS with an acid can cause the AIE-gens to aggregate, providing an enhanced fluorescence emission from the AIE-gen and an alteration of the surface polarity and wettability of the AIEFS. In an embodiment, the wettability of the acid-contacted AIEFS can increase.

In an embodiment, a method of detecting for a presence of an acid on a surface of a material can include functionalizing the surface of the material with the compound and monitoring a fluorescent intensity emitted from the compound after the surface is functionalized with the compound.

BRIEF DESCRIPTION OF DRAWINGS

Various embodiments will now be described in detail with reference to the accompanying drawings.

FIGS. 2A-2F depict (2A) PL spectra of TPI-Si-functionalized surface (TFS) before HCl fuming, 180 seconds after HCl fuming, and 3 hours after HCl fuming; (2B) a plot of relative PL intensity (I/I$_0$) of TFS before and after 180 seconds HCl fuming at different time steps; (2C) a plot of reversible change in the fluorescent intensity of TFS by alternative HCl fuming, i.e., 10 seconds after HCl fuming and 180 seconds after HCl fuming; (2D) a plot of TFA gas-responsive PL spectra of TFS without fuming, after 1 second of TFA fuming, and after 8 minutes of TFA fuming; (2E) a plot of relative PL intensity (I/I$_0$) of TFS before and after 1 second of TFA fuming at different time steps; and (2F) a plot showing TFA gas-responsive fluorescent intensity is reversible after 1 second of TFA fuming.

FIGS. 3A-3B depict (3A) PL spectra of the TFS before HCl fuming, after 10 seconds of HCl fuming, and 20 minutes after HCl fuming; and (3B) a plot of relative PL intensity (I/I$_0$) of TFS before HCl fuming and after 10 seconds of HCl fuming under different time steps.

DETAILED DESCRIPTION

Definitions

Figure 1A:
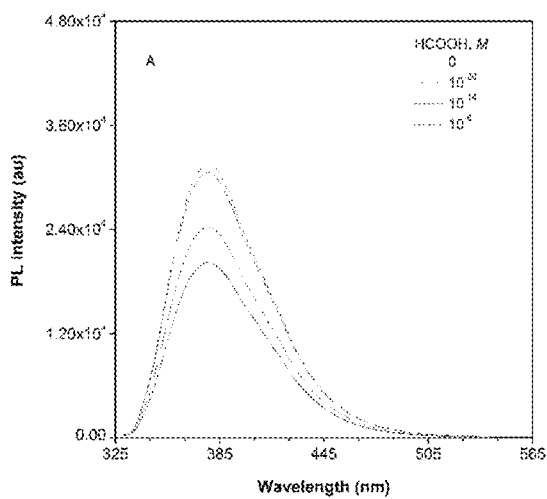
FIGS. 1A-1C depict PL spectra of TPI-C (10 μM in THF/hexane mixtures with $f_H$=99%) with adding (1A) HCOOH at different concentrations; (1B) CH$_3$COOH at different concentrations; and (1C) CF$_3$COOH at different concentrations.

The following definitions are provided for the purpose of understanding the present subject matter and for constructing the appended patent claims.

It is noted that, as used in this specification and the appended claims, the singular forms "a", "an", and "the" include plural references unless the context clearly dictates otherwise.

The term "$\lambda_{ex}$" as used herein refers to excitation wavelength.

The phrase "aggregation caused quenching" or "ACQ" as used herein refers to the phenomenon wherein the aggregation of π-conjugated fluorophores significantly decreases the fluorescence intensity of the fluorophores. The aggregate formation is said to "quench" light emission of the fluorophores.

The phrase "aggregation induced emission" or "AIE" as used herein refers to the phenomenon manifested by compounds exhibiting significant enhancement of light-emission upon aggregation in the amorphous or crystalline (solid) states whereas they exhibit weak or almost no emission in dilute solutions.

"Emission intensity" as used herein refers to the magnitude of fluorescence/phosphorescence normally obtained from a fluorescence spectrometer or fluorescence microscopy measurement; "fluorophore" or "fluorogen" as used herein refers to a molecule which exhibits fluorescence; "luminogen" or "luminophore" as used herein refers to a molecule which exhibits luminescence; and "AIEgen" as used herein refers to a molecule exhibiting AIE characteristics.

As used herein, "halo" or "halogen" refers to fluoro, chloro, bromo, and iodo.

As used herein, "alkyl" refers to a straight-chain or branched saturated hydrocarbon group. Examples of alkyl groups include methyl (Me), ethyl (Et), propyl (e.g., n-propyl and z'-propyl), butyl (e.g., n-butyl, z'-butyl, sec-butyl, tert-butyl), pentyl groups (e.g., n-pentyl, z'-pentyl, -pentyl), hexyl groups, and the like. In various embodiments, an alkyl group can have 1 to 40 carbon atoms (i.e., C1-40 alkyl group), for example, 1-30 carbon atoms (i.e., C1-30 alkyl group). In some embodiments, an alkyl group can have 1 to 6 carbon atoms, and can be referred to as a "lower alkyl group". Examples of lower alkyl groups include methyl, ethyl, propyl (e.g., n-propyl and z'-propyl), and butyl groups (e.g., n-butyl, z'-butyl, sec-butyl, tert-butyl). In some embodiments, alkyl groups can be substituted as described herein. An alkyl group is generally not substituted with another alkyl group, an alkenyl group, or an alkynyl group.

As used herein, "alkenyl" refers to a straight-chain or branched alkyl group having one or more carbon-carbon double bonds. Examples of alkenyl groups include ethenyl, propenyl, butenyl, pentenyl, hexenyl, butadienyl, pentadienyl, hexadienyl groups, and the like. The one or more carbon-carbon double bonds can be internal (such as in 2-butene) or terminal (such as in 1-butene). In various embodiments, an alkenyl group can have 2 to 40 carbon atoms (i.e., C2-40 alkenyl group), for example, 2 to 20 carbon atoms (i.e., C2-20 alkenyl group). In some embodiments, alkenyl groups can be substituted as described herein. An alkenyl group is generally not substituted with another alkenyl group, an alkyl group, or an alkynyl group.

As used herein, "heteroatom" refers to an atom of any element other than carbon or hydrogen and includes, for example, nitrogen, oxygen, silicon, sulfur, phosphorus, and selenium.

As used herein, "aryl" refers to an aromatic monocyclic hydrocarbon ring system or a polycyclic ring system in which two or more aromatic hydrocarbon rings are fused (i.e., having a bond in common with) together or at least one aromatic monocyclic hydrocarbon ring is fused to one or more cycloalkyl and/or cycloheteroalkyl rings. An aryl group can have 6 to 24 carbon atoms in its ring system (e.g., C6-24 aryl group), which can include multiple fused rings. In some embodiments, a polycyclic aryl group can have 8 to 24 carbon atoms. Any suitable ring position of the aryl group can be covalently linked to the defined chemical structure. Examples of aryl groups having only aromatic carbocyclic ring(s) include phenyl, 1-naphthyl (bicyclic), 2-naphthyl (bicyclic), anthracenyl (tricyclic), phenanthrenyl (tricyclic), pentacenyl (pentacyclic), and like groups. Examples of polycyclic ring systems in which at least one aromatic carbocyclic ring is fused to one or more cycloalkyl and/or cycloheteroalkyl rings include, among others, benzo derivatives of cyclopentane (i.e., an indanyl group, which is a 5,6-bicyclic cycloalkyl/aromatic ring system), cyclohexane (i.e., a tetrahydronaphthyl group, which is a 6,6-bicyclic cycloalkyl/aromatic ring system), imidazoline (i.e., a benzimidazolinyl group, which is a 5,6-bicyclic cycloheteroalkyl/aromatic ring system), and pyran (i.e., a chromenyl group, which is a 6,6-bicyclic cycloheteroalkyl/aromatic ring system). Other examples of aryl groups include benzodioxanyl, benzodioxolyl, chromanyl, indolinyl groups, and the like. In some embodiments, aryl groups can be substituted as described herein. In some embodiments, an aryl group can have one or more halogen substituents, and can be referred to as a "haloaryl" group. Perhaloaryl groups, i.e., aryl groups where all of the hydrogen atoms are replaced with halogen atoms (e.g., —$C_6F_5$), are included within the definition of "haloaryl". In certain embodiments, an aryl group is substituted with another aryl group and can be referred to as a biaryl group. Each of the aryl groups in the biaryl group can be substituted as disclosed herein.

As used herein, "heteroaryl" refers to an aromatic monocyclic ring system containing at least one ring heteroatom selected from oxygen (O), nitrogen (N), sulfur (S), silicon (Si), and selenium (Se) or a polycyclic ring system where at least one of the rings present in the ring system is aromatic and contains at least one ring heteroatom. Polycyclic heteroaryl groups include those having two or more heteroaryl rings fused together, as well as those having at least one monocyclic heteroaryl ring fused to one or more aromatic carbocyclic rings, non-aromatic carbocyclic rings, and/or non-aromatic cycloheteroalkyl rings. A heteroaryl group, as a whole, can have, for example, 5 to 24 ring atoms and contain 1-5 ring heteroatoms (i.e., 5-20 membered heteroaryl group). The heteroaryl group can be attached to the defined chemical structure at any heteroatom or carbon atom that results in a stable structure. Generally, heteroaryl rings do not contain O—O, S—S, or S-0 bonds. However, one or more N or S atoms in a heteroaryl group can be oxidized (e.g., pyridine N-oxide thiophene S-oxide, thiophene S,S-dioxide). Examples of heteroaryl groups include, for example, the 5- or 6-membered monocyclic and 5-6 bicyclic ring systems shown below: where T is O, S, NH, N-alkyl, N-aryl, N-(arylalkyl) (e.g., N-benzyl), $SiH_2$, SiH(alkyl), Si(alkyl)₂, SiH(arylalkyl), Si(arylalkyl)₂, or Si(alkyl)(arylalkyl). Examples of such heteroaryl rings include pyrrolyl, furyl, thienyl, pyridyl, pyrimidyl, pyridazinyl, pyrazinyl, triazolyl, tetrazolyl, pyrazolyl, imidazolyl, isothiazolyl, thiazolyl, thiadiazolyl, isoxazolyl, oxazolyl, oxadiazolyl, indolyl, isoindolyl, benzofuryl, benzothienyl, quinolyl, 2-methylquinolyl, isoquinolyl, quinoxalyl, quinazolyl, benzotriazolyl, benzimidazolyl, benzothiazolyl, benzisothiazolyl, benzisoxazolyl, benzoxadiazolyl, benzoxazolyl, cinnolinyl, 1H-indazolyl, 2H-indazolyl, indolizinyl, isobenzofuyl, naphthyridinyl, phthalazinyl, pteridinyl, purinyl, oxazolopyridinyl, thiazolopyridinyl, imidazopyridinyl, furopyridinyl, thienopyridinyl, pyridopyrimidinyl, pyridopyrazinyl, pyridopyridazinyl, thienothiazolyl, thienoxazolyl, thienoimidazolyl groups, and the like. Further examples of heteroaryl groups include 4,5,6,7-tetrahydroindolyl, tetrahydroquinolinyl, benzothienopyridinyl, benzofuropyridinyl groups, and the like. In some embodiments, heteroaryl groups can be substituted as described herein.

As used herein, a "donor" material refers to an organic material, for example, an organic nanoparticle material, having holes as the majority current or charge carriers.

As used herein, an "acceptor" material refers to an organic material, for example, an organic nanoparticle material, having electrons as the majority current or charge carriers.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Compounds

The present subject matter contemplates organic compounds having aggregation-induced emission (AIE) characteristics. The compounds, also referred to herein as "AIEgens," or "fluorescent compounds" can sense or detect a presence of acid through aggregation which induces fluorescence. For example, a fluorescent intensity emitted from the compound is enhanced from an original intensity level to an enhanced intensity level in the presence of an acid.

According to an embodiment, a fluorescent compound for acid detection comprises the following backbone structure:

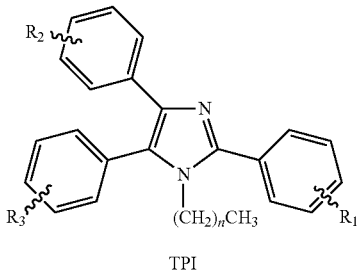

TPI wherein $R_1$ is selected from the group consisting of

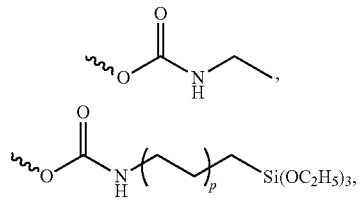

—$(CH_2)_nCH_3$, —F, —Cl, —Br, —I, —COOH, and —CHO;
wherein $R_2$ is selected from the group consisting of

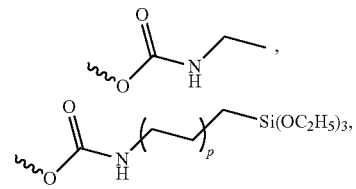

—H, —$(CH_2)_nCH_3$, —F, —Cl, —Br, —I, —OH, —COOH, and —CHO;
wherein $R_3$ is selected from the group consisting of

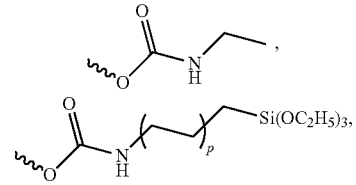

—H, —$(CH_2)_nCH_3$, —F, —Cl, —Br, —I, —OH, —COOH, and —CHO;
wherein n is an integer ranging from 0-100; and
wherein p is an integer ranging from 1-100.

In some embodiments, $R_2$ and $R_3$ are the same. In some embodiments, $R_2$ is H and $R_3$ is H. In some embodiments, $R_2$ and $R_3$ are different.

In an embodiment, the compounds are selected from:

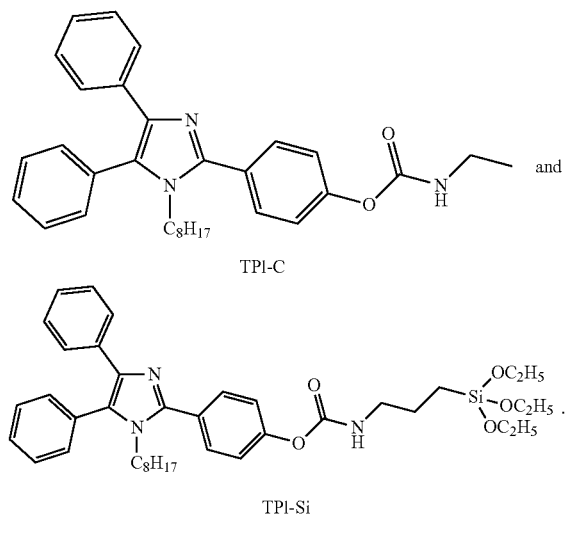

TPI-C

TPI-Si

AIE Activity

The present compounds are strongly emissive in the solid state with good fluorescent quantum yields. Acid treatment can restrict intermolecular motion, thus enhancing emission. Accordingly, a fluorescent intensity emitted from the compound is enhanced from an original intensity level in the presence of an acid. As described in detail herein, for example, AIEgen aggregates can respond to acid with high sensitivity due to anion-$\pi^+$ interactions. Specifically, by way of one non-limiting example, the interaction generated by an ion pair after treatment with an acid can restrict the intermolecular motion, thus enhancing emission.

AIE-gen-Functionalized Surface (AIEFS)

The present compounds can functionalize or modify a surface of a substrate to provide an AIE-gen Functionalized Surface (AIEFS). As described herein, the present compounds can self-assemble on the substrate surface to form a non-wettable, hydrophobic AIEFS. In an embodiment, the substrate is selected from silicon, glass, and quartz. In an embodiment, fluorescence and wettability of the AIEFS can be reversibly modulated. In an embodiment, the wettability of the AIEFS can be non-reversible.

Once functionalized with the AIE-gen, contacting the AIEFS with an acid can cause the AIE-gens to aggregate, providing an enhanced fluorescence emission from the AIE-gen and an alteration of the surface polarity and wettability of the AIEFS. The acid can be in a gas or solution state. Thus, a fluorescent intensity emitted from the AIEFS is enhanced from an original intensity level in the presence of an acid.

In an embodiment, the alteration of wettability is reversible. For example, a fluorescent intensity emitted from the compound can be enhanced within about 1 second to about 3 minutes after acid fuming, either taken alone or functionalized on the surface. The fluorescent intensity can return to the original intensity level within about 3 minutes to about 45 minutes after fuming with the acid. The compound can emit an enhanced fluorescent intensity in the presence of at least about $10^{-20}$ M of the acid. The acid-fumed surface or surface portion can become wettable and hydrophilic for a limited amount of time after contacting the acid before becoming hydrophobic again after contact with the acid is lost.

In an embodiment, the alteration of wettability is non-reversible. For example, dipping the AIEFS in acid can irreversibly increase the wettability of the AIEFS.

In an embodiment, a method of detecting for a presence of an acid on a surface of a material can include functionalizing the surface of the material with the present compound and monitoring a fluorescent intensity emitted from the compound after the surface is functionalized with the compound. The surface can be functionalized by self-assembly of the compound on the material surface. For example, a solution of the present compound can be coated onto the surface to permit self-assembly thereon. This may be done, by way of non-limiting example, by spin-coating the compound on the surface followed by heating. The coated wafer can then be washed to remove excess compound which did not self-assemble onto the surface. An enhanced fluorescent intensity of the compound indicates the presence of the acid on the surface of the material.

In an embodiment, the compound aggregates in the presence of the acid. Accordingly, fluorescent intensity of the surface will be enhanced after the surface is first functionalized with the present compound and then contacted with an acid. The acid can be in a state selected from the group consisting of a gas state and a solution state. The compound can emit an enhanced fluorescent intensity in the presence of at least about $10^{-20}$ M of the acid. The fluorescent intensity can be enhanced within about 1 second to about 3 minutes after the acid contacts the surface of the material. As such, is possible to monitor for and detect when a surface comes into contact with an acid provided the surface is first functionalized with the present compound The AIEFS, in the wettable state, can be less adhesive to bacteria than in the non-wettable state. Accordingly, an AIEFS is able to control bacterial adhesion behavior by tuning the surface wetting status. This makes it possible to regulate bio-adhesion using smart surfaces with tunable surface physical and chemical properties.

The present teachings are illustrated by the following examples.

EXAMPLES

Materials and Instrumentation

Chemicals were purchased from Energy-Chemical, Sigma-Aldrich, J&K and used without further purification. Solvents and other common reagents were obtained from Sigma-Aldrich. $^1$H NMR and $^{13}$C NMR spectra were measured on a Bruker ARX 400 MHz spectrometer. High-resolution mass spectra (HRMS) were recorded on a GCT Premier CAB 048 mass spectrometer operating in MALDI-TOF mode. Photoluminescence (PL) spectra were measured on Fluorolog®-3 spectrofluorometer and FLSP920 fluorescence spectrophotometer. TPI-OH was synthesized according to the literature, the molecular structure of TPI-OH is shown below

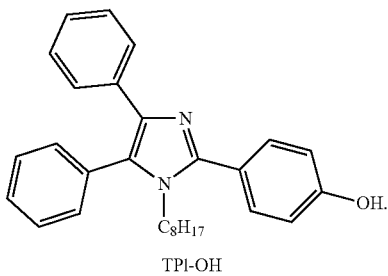

TPI-OH

Example 1

Synthesis

Synthesis of TPI-C
The molecular structure of TPI-C is shown below.

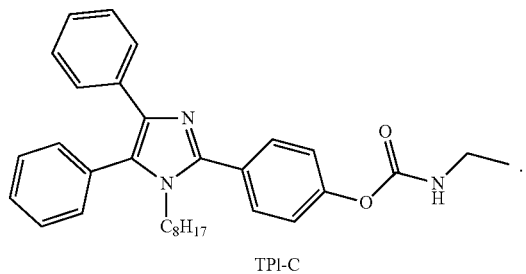

TPI-C

To a solution of TPI-OH (212 mg, 0.50 mmol) in dry dichloromethane (5 mL) was added one drop of Et$_3$N and ethyl isocyanate (43 mg, 0.6 mmol). The reaction mixture was stirred at room temperature for 4 h. The solvent was removed under vacuum. Then the residue was washed and recrystallized with acetonitrile. TPI-OH was obtained as white solid (480 mg, 97%). $^1$H NMR (400 MHz, Chloroform-d) δ 7.69 (d, J=8.5 Hz, 2H), 7.55-7.44 (m, 5H), 7.43-7.41 (m, 2H), 7.27 (d, J=8.5 Hz, 2H), 7.23-7.17 (m, 2H), 7.16-7.10 (m, 1H), 5.08 (t, J=5.2 Hz, 1H), 3.87 (t, J=7.7 Hz, 2H), 3.38-3.31 (m, 2H), 1.38-1.31 (m, 2H), 1.27-1.18 (m, 5H), 1.15-1.02 (m, 4H), 1.01-0.92 (m, 4H), 0.84 (t, J=7.2 Hz, 3H). $^{13}$C NMR (100 MHz, CDCl$_3$) δ 153.48, 150.90, 146.35, 137.07, 133.95, 130.92, 130.38, 129.52, 129.03, 128.37, 127.97, 127.75, 127.38, 126.17, 125.55, 121.04, 44.19, 35.53, 30.96, 29.79, 28.19, 27.97, 25.55, 21.92, 14.50, 13.42. HRMS (MALDI-TOF): m/z: [M+H]$^+$ calcd for C$_{32}$H$_{38}$N$_3$O$_2$: 496.2964; found: 496.2988.

Synthesis of TPI-Si
The molecular structure of TPI-Si is shown below:

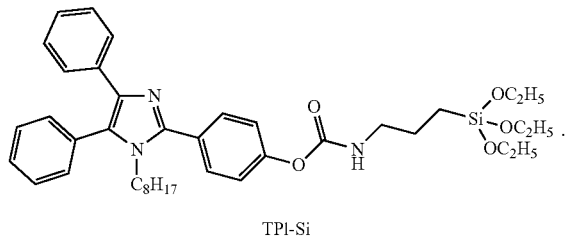

TPI-Si

To a solution of TPI-OH (212 mg, 0.50 mmol) in dry dichloromethane (5 mL) was added one drop of Et$_3$N and 3-isocyanatopropyltriethoxysilane (124 mg, 0.5 mmol). The reaction mixture was stirred at room temperature for 8 h. The solvent was removed under vacuum. TPI-Si was obtained as colourless oil liquid. HRMS (MALDI-TOF): m/z: [M+H]$^+$ calcd for C$_{39}$H$_{54}$N$_3$O$_5$Si: 672.3833; found: 672.3809.

Example 2

Acid Testing

Figure 1B:
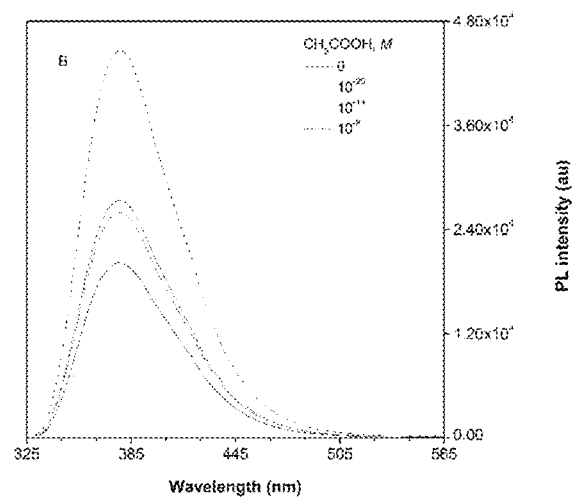
Figure 1C:
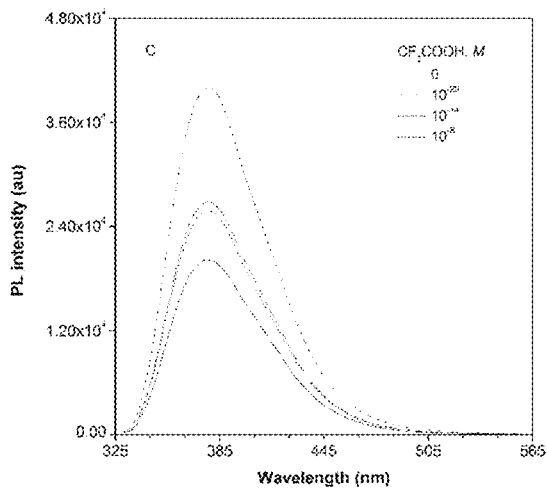
Figure 1D:
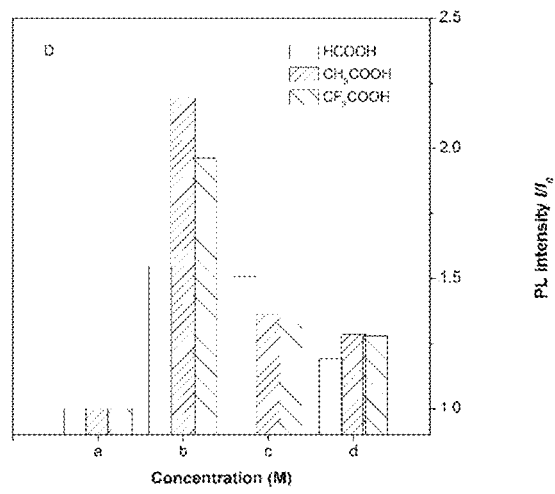
FIG. 1D is a graph of relative PL intensity (I/I$_0$) at different acid concentrations (x-axis represents acid concentration at (a) 0 M, (b) 1×10$^{-20}$ M, (c) 1×10$^{-14}$ M and (d) 1×10$^{-8}$ M, respectively).

An acid response study of TPI-C in the aggregation state was performed first. The fluorescent intensity response of TPI-C was investigated by adding different acids with various concentrations. In general, the fluorescent intensity of TPI-C was enhanced upon adding the acid. TPI-C responded in this manner to the formic acid, acetic acid (AcOH) and trifluoroacetic acid (TFA) at concentrations as low as $10^{-20}$ M. For the formic acid, its highest intensity enhancement was around 55% at the acid concentration level of $10^{-20}$ M, as shown in FIG. 1A. When AcOH (1×$10^{-20}$ M, 1 µL) and TFA (1×$10^{-20}$ M, 1 µL) were added to the TPI-C solution, the intensity enhancement of TPI-C was around 120% (FIG. 1B) and 96% (FIG. 1C), respectively.

Example 3

TPI-Si-Functionalized Surface (TFS)

TPI-Si-functionalized substrate (TFS) was prepared as follows. A 525 µm thick silicon wafer was used in the experiment. First, the silicon wafer was initially cleaned to remove the metals and organic residues by immersing the wafer in a mixture of H$_2$SO$_4$:H$_2$O$_2$ (10:1) under 120° C. for 10 minutes. Then, the wafer was dipped in the mixture of H$_2$O: HF (50:1) for 1 minute to remove the native oxide layer. The TFS was fabricated by a self-assembly approach. TPI-Si was first dispersed in THF to form a 0.5 mg/mL solution. The resulting solution was spin-coated on the silicon wafer followed by heating in an oven under 140° C. for 1 hour. The coated wafer was then washed by THF to remove the extra TPI-Si which did not self-assemble onto the substrate. Afterward, the coated wafer was dried with an air gun.

Example 4

AIEgen-functionalized Surface with Reversible Fluorescence upon Acid Vapor Stimuli The PL spectra of TFS upon acid vapor stimulus is presented in FIGS. 2A-2F. Compared to the surface without any acid vapor fuming, the PL intensity of the surface was enhanced significantly after 180 seconds of hydrochloric acid (HCl) fuming (FIG. 2A). The intensity was enhanced to 309% higher than the non-fuming surface. Then after 3 hours, the PL intensity of the surface was self-recovered (FIG. 2A). It is believed that after the imidazole compound is ionized by acid molecules and forms a salt, the compound dissociates itself then reverses to the initial neutral state of imidazole and releases high volatile HCl molecules back to the air. The plot of relative PL intensity (I/I$_0$) of TFS before and after 180 seconds of HCl fuming under different time steps is shown in FIG. 2B. The 50% intensity drop is recorded around 45 minutes. The reversibility and repeatability of the systems were also tested. FIG. 2C shows the repeatable response achieved upon 180 seconds of HCl fuming. Results show that the relative PL intensity ($I/I_0$) exerted little change even after 10 consecutive "HCl fuming"/"self-recover" cycles. This indicates that the HCl vapor-enhanced emission intensity of TFS was reversible. By fuming TFS using HCl for 10 seconds, the PL intensity of the surface was enhanced to 31% higher than without HCl fuming, as shown in FIGS. 3A-3B. Repeatable response of TFS upon 10 seconds of HCl fuming is shown in FIG. 2C, demonstrating good reversibility of the surface.

From the results above, it is apparent that by fuming TFS with a common volatile acid, HCl, the fluorescent signal of the surface can be modulated with fast response and good reversibility through a simple approach. TPI-C nano-aggregates can respond to TFA with a high sensitivity. In addition, TFA is more volatile than HCl.

The fluorescent response of the functionalized surface by TFA vapor fuming was further investigated. TFS showed ultra-fast response upon TFA fuming, as shown in FIG. 2D. With 1 second of TFA fuming, the PL intensity of the surface was significantly enhanced about 73% higher than without fuming, and the PL intensity was self-recovered after 8 minutes. The anion-$\pi^+$ interactions and hydrogen bonding between the imidazole ring and anion pairs of TFA seemed strong enough to enhance the fluorescent intensity significantly upon only 1 second of TFA fuming. The plot of relative PL intensity ($I/I_0$) of TFS before and after 1 second of TFA fuming under different time steps is shown in FIG. 2E. 50% intensity recovery was achieved after only 3 minutes (180 seconds), which is faster than that achieved by HCl fuming. This may be because there were not as many acid molecules accumulated on the surface, given such a short period of fuming time and because TFA is generally more volatile than HCl. Meanwhile, the surface also showed repeatable response with good reversibility upon 1 second of TFA fuming (FIG. 2F).

Figure 4:
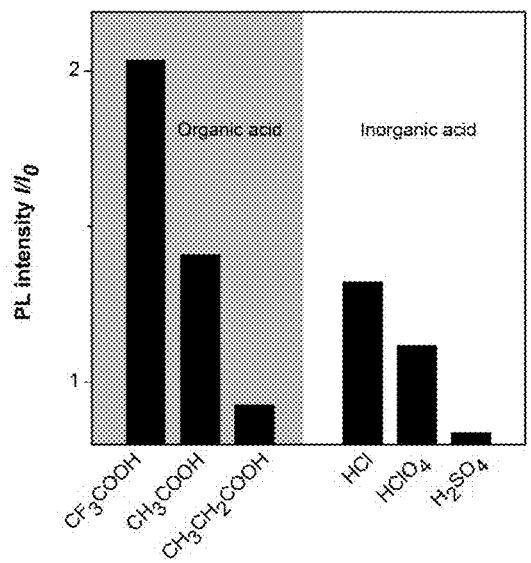
FIG. 4 is a graph showing the fluorescent intensity of the TFS under different acid gas stimulus (for each acid, the surface was fumed for 10 seconds).

The fluorescent intensity of TFS with different acid vapor stimulus is shown in FIG. 4. For both organic acids and inorganic acids, TFS showed acid vapor-enhanced emission intensity. The results further demonstrated that upon 10 seconds of TFA, AcOH, HCl and perchloric acid fuming, the PL intensity can be enhanced 104%, 41%, 32% and 12% higher than the initial state, respectively. Due to the weak acidity of propionic acid and the low volatility of sulfuric acid, a significant emission intensity enhancement was not achieved upon fuming with these acids.

Example 5

AIEgen-functionalized Surface with Tunable Wettability

Figures 5A, 5B, 5C, 5D, 5E, 5F, 5G, 5H, 5I:
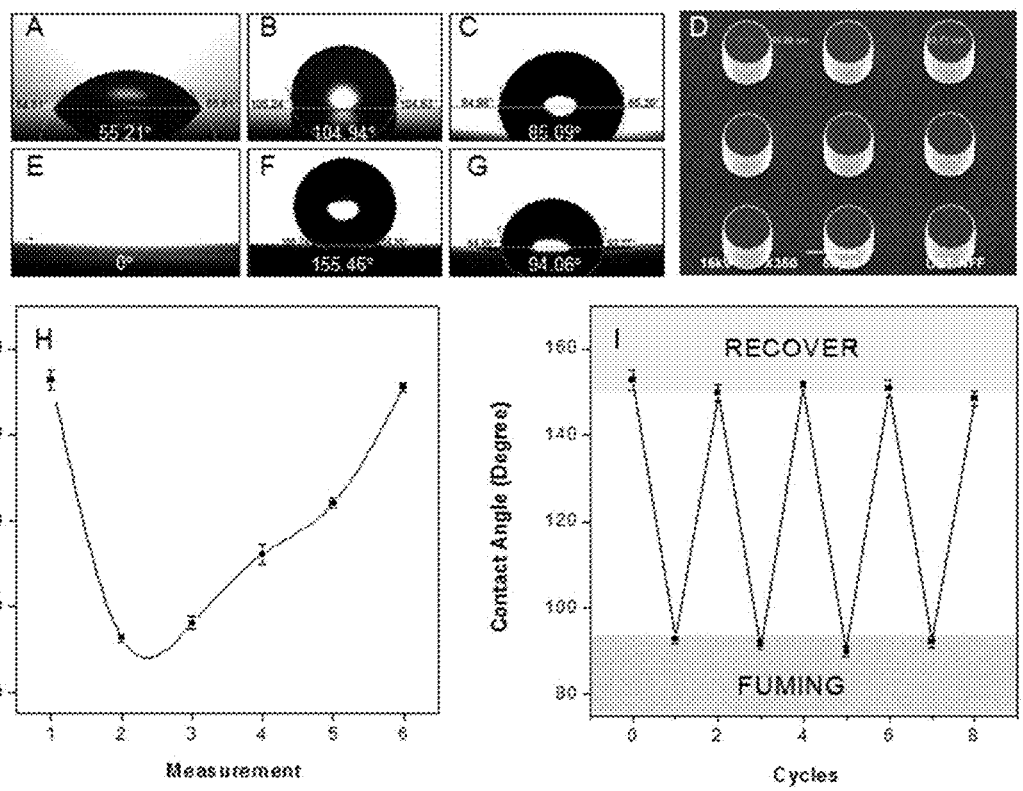
FIGS. 5A-5I depict (5A) water droplet profile on the surface of silicon wafer with native oxide; (5B) water droplet profile on the surface of silicon wafer functionalized with TPI-Si, (5C) water droplet profile on the surface of silicon wafer functionalized with TPI-Si after 3 minutes of HCl fuming; (5D) SEM image of silicon micro-pillar structure; (5E) water droplet profile on the surface of silicon micro-pillar structure with native oxide; (5F) water droplet profile on the surface of silicon micro-pillar structure functionalized with TPI-Si, (5G) water droplet profile on the surface of silicon micro-pillar structure functionalized with TPI-Si after 3 minutes of HCl fuming; (5H) a graph showing tunable wettability of the TPI-Si functionalized micro-pillar surface (measurement 1 and 2 are taken before and after 3 min. of HCl fuming, measurements 3-6 are taken 15 min., 30 min., 60 min., and 3 hours after 3 min. of HCl fuming; (5I) is a graph showing that reversible change in the wettability of TFS with micro-pillar structure can be realized by regulating surface polarity (using acid fuming).

It is believed that once TFS is stimulated by acid vapor, the polarity of the surface changes due to the protonation at the imidazole ring. The polarity change can lead to a difference in wettability of the surface. For example, as shown in FIG. 5A, the static contact angle (CA) of the silicon wafer was initially around 55°. After the silicon wafer was functionalized with TPI-Si using the self-assembly approach, the CA of TFS was about 105°, confirming the hydrophobicity of the surface, as shown in FIG. 5B. It is believed that the resulting hydrophobicity of the surface was due to the alkyl chain on the TPI-Si. When TFS was fumed with HCl for 3 minutes, the surface was protonated and the wetting status of the surface changed to hydrophilic, with the CA being about 85°, as shown in FIG. 5C. It is clear that TFS does possess the ability to be controlled with tunable wetting status.

TFS was further fabricated with micro-pillars in order to achieve a larger wettability difference. Deep reactive ion etching (DRIE) was used to fabricate uniform micro-pillars on the silicon substrate. The micro-pillar structures included circular pillars on a flat silicon wafer. The pillars were about 50 µm in diameter, about 50 µm high, and spaced about 50 µm from each other, as shown in FIG. 5D. Before the silicon micro-pillar surface was functionalized by TPI-Si, the static CA of silicon with micro-pillar was 0° (FIG. 5E). After the micro-pillar structure was fabricated on the silicon substrate, the surface was easily functionalized with TPI-Si by self-assembly, as described previously. After the surface with micro-pillar was functionalized with TPI-Si, the CA of TFS was about 155°, confirming the super-hydrophobicity of the surface, as shown in FIG. 5F.

The transition in wettability of the functionalized surface was realized by changing the surface polarity. For example, upon 3 minutes of HCl fuming, the surface was protonated and the wetting status of the surface changed to hydrophilic with a CA of around 94°, as shown in FIG. 5G. The obtained wetting status self-recovered to above 150° after 3 hours. FIG. 5H provides the CA change at different time steps. A 50% recovery of the CA was achieved in about 60 minutes. The CA was repeatedly changed from an initial level to a different level and then reversed to the initial level for several cycles, as shown in FIG. 5I, demonstrating a good reversibility of the surface.

Figures 6A, 6B, 6C, 6D, 6E, 6F, 6G, 6H:
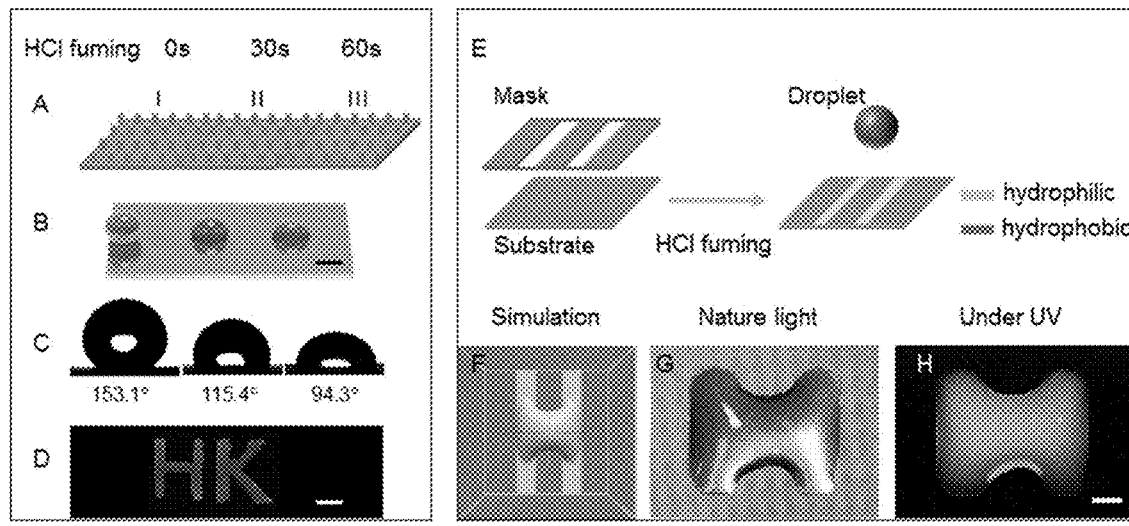
FIGS. 6A-6H depict (6A) a diagram of an exemplary surface for creating different wettabilities (area I, II and III are fumed with HCl for 0 s, 30 s and 60 s respectively); (6B) a diagram of the different water droplet contact angles achieved for each of areas I, II, and III (from left to right) (scale bar represents 2 mm); (6C) a diagram of the different water droplet contact angles achieved for each of areas I, II, and III (from left to right); (6D) a diagram of an exemplary surface (scale bar represents 5 mm) covered with a mask having openings shaped as the letters "HK" defined therethrough (after acid fuming, the area inside the "HK" openings was hydrophilic, while the remaining area stayed hydrophobic); (6E) a schematic depicting the process of creating wettability patterns on the TFS; (6F) a numerical simulation (6G) image under natural light of water droplet that is restrained from spreading by patterned surface; and (6H) image under under UV irradiation at 365 nm (scale bar represents 2 mm) of water droplet that is restrained from spreading by patterned surface.

TFS demonstrated good controllability and reversibility in surface polarity. As such, TFS can be useful in a variety of applications, including, use as a reusable surface for creating various wettability gradients of patterns. To explore the ability of TFS as a reusable smart surface capable of achieving different wettabilities, as shown in FIG. 6A, the surface was divided into three parts from the left to the right in the following sequence: I. TFS with micro-pillar structure; II. TFS fumed by HCl for 30 seconds; and TFS fumed with HCl for 60 seconds. It can be seen that by regulating surface polarity, gradient wetting from super-hydrophobicity to almost hydrophilic in the same direction can be realized on the same surface (FIGS. 6B and 6C). Importantly, due to the excellent controllability and reversibility of surface chemistry, TFS can be reusable.

As shown in FIG. 6D, a mask was used to partially cover the TFS surface during HCL fuming. The mask had "H" and "K" shaped openings defined therethrough. As such, only the portion of the surface that remained exposed by these openings was fumed by HCl and became hydrophilic. Acid fuming was followed by rapidly brushing the surface with a water solution of hydrophilic AIE NPs with carboxylic acid groups. It was found that more of the NPs remained at the hydrophilic "HK" portion than at the remaining super-hydrophobic area. This experiment confirmed the intensive adhesion between carboxylic acid groups and the hydrophilic fumed area.

In FIGS. 6E to 6H, wettability patterns were created on TFS and the obtained patterns successfully demonstrated control of water droplet spreading behaviour. A schematic of an exemplary process for creating wettability patterns on TFS is provided in FIG. 6E. The surface was covered by a mask with two parallel openings and then fumed with HCl. Thus, two hydrophilic strips were obtained on the hydrophobic surface. The covered part of the surface remained hydrophobic with a CA of 146°. The two strips represent the hydrophilic area with a CA of about 80°.

The shape of small liquid droplets on the chemically structured surface was determined by the interplay of the interfacial free energies of the droplet and the wettability pattern on the surface. FIG. 6F shows the numerical result of the droplet spreading on the heterogeneous surface. The three-dimensional model was developed by using Shan-Chen type multiphase lattice Boltzmann method. From the results, it can be seen that after the droplet approaches the equilibrium state, it has a symmetric 'H' shape viewed from the top. FIG. 6G shows the experimental result under natural light, which is similar to the numerical result. The 'H' shape of liquid was obtained using the patterned TFS. It can be seen that wettability patterns can be easily obtained on TFS by using a mask and several seconds or minutes of acid fuming. The water droplet in FIG. 6E was seeded with AIEgen Orange and the fluorescent image was captured under UV irradiation (UV excitation (365 nm)), as shown in FIG. 6H. In this fluorescent photo, emission of the seeded AIEgen Orange was clearly captured. Meanwhile the UV emission of TFS was invisible and did not interfere with fluorescent data collection. Thus, TFS can be a proper candidate for applications using other fluorescent dyes.

Example 6

Controlling Bacterial Adhesion

Adhesion behaviour of bacteria was tested on TFS with various wettabilities. It was demonstrated that wettability regulated bacteria adhesion.

E. coli. bacteria (from ATCC). were cultured in Luria-Bertani (LB) broth LB medium overnight at 37° C. with a shaking speed of 200 rpm. Bacteria were harvested by centrifugation at 8000 rpm for 3 minutes and washed twice by PBS. The optical density of the bacteria suspension was measured on a microplate reader (Tecan, infinite M200, Switzerland) at 600 nm. All samples were individually placed in a 24 well-plate. A volume of 300 µL ($10^6$ CFU/mL) of bacterial culture was added in each well, and the plate was then statically incubated at 37° C. for 3 h. The samples were washed with normal saline twice and stained with 2.5 µL of SYTO®9 (S34854, Invitrogen.) dye solution (3 µM) for 15 min. After washing with normal saline twice, the samples were imaged using confocal microscopy (Zeiss LSM 710 laser scanning confocal microscope). The amount of attached bacterial cells was expressed as the mean±standard deviation bacterial count of six images. Statistical analysis was done using Software ImageJ.

Figures 7A, 7B, 7C, 7D, 7E:
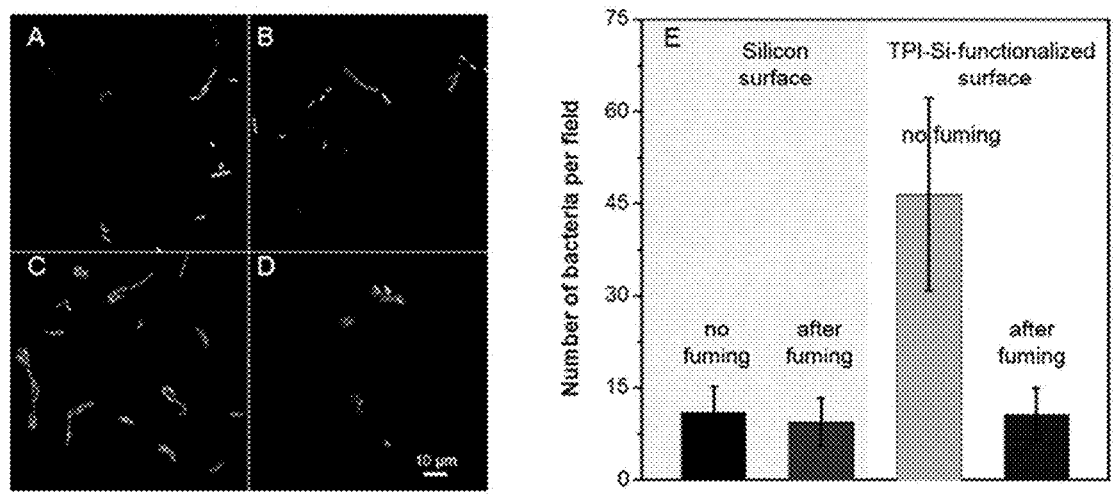
FIGS. 7A-7E depict (7A) fluorescent image of E. coli adhesion on surface of silicon substrate after 3 hours (7B) fluorescent image of the silicon substrate of (7A) after 3 min. of HCl fuming; (7C) fluorescent image of E. coli adhesion on surface of TFS after 3 hours; (7D) fluorescent image of the TFS of (7C) after 3 min. of HCl fuming; and (7E) a graph showing E. coli adhesion on the four kinds of substrates of (7A)-(7D) (each observation field is 101.41 μm×101.41 μm).

FIGS. 7A to 7D provide fluorescent images of the adsorbed E. coli stained with SYTO®9. The investigation of E. coli on bare silicon substrate, with a CA of about 55°, showed that not much bacterial adhesion occurred (FIG. 7A). Significant increase of E. coli adhesion was observed on TFS, with a CA at 105° (FIG. 7C). The adhered amount of E. coli was increased by 292% on TFS compared to the bare silicon substrate, as shown in FIG. 7E. For the E. coli adhesion on the HCl fumed TFS (CA=80°), the adhered amount of E. coli was significantly decreased by 72% compared to the non-fuming functionalized surface (FIGS. 7D and 7E). This E. coli adhesion behaviour difference was not caused by the acid vapor itself, as shown in FIGS. 7B and 7E.

The investigation of E. coli adhesion on TFS demonstrated that the smart AIEgen-functionalized surface has the capability of controlling bacterial adhesion behavior by tuning the surface wetting status. Thus, it is possible to regulate bio-adhesion using smart surfaces with tunable surface physical and chemical properties.

Example 7

Permanently Functionalized Surface for Non-reversible Wettabilities

Figures 8A, 8B, 8C, 8D:
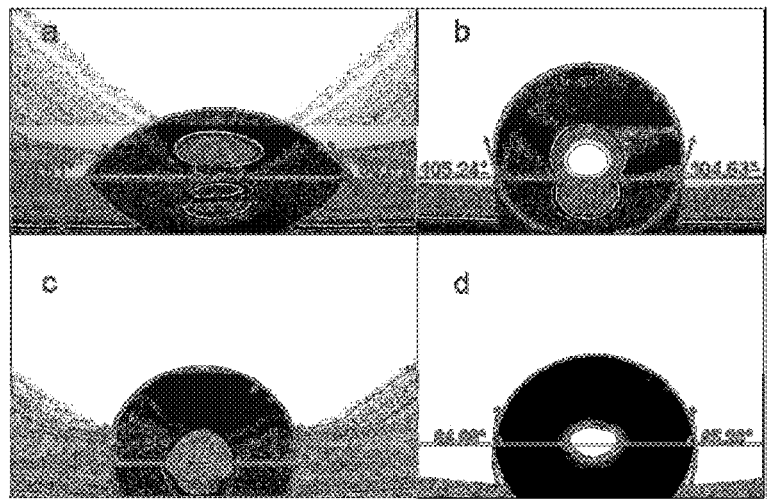
FIGS. 8A-8D depict (8A) water droplet profile on the surface of silicon wafer with native oxide; (8B) water droplet profile on the surface of silicon wafer functionalized with TPI-Si, (8C) water droplet profile on the surface of silicon wafer functionalized with TPI-Si and after acetic acid dipping; (8D) water droplet profile on the surface of silicon wafer functionalized with TPI-Si and after hydrochloric acid dipping.
Figures 9A, 9B, 9C, 9D:
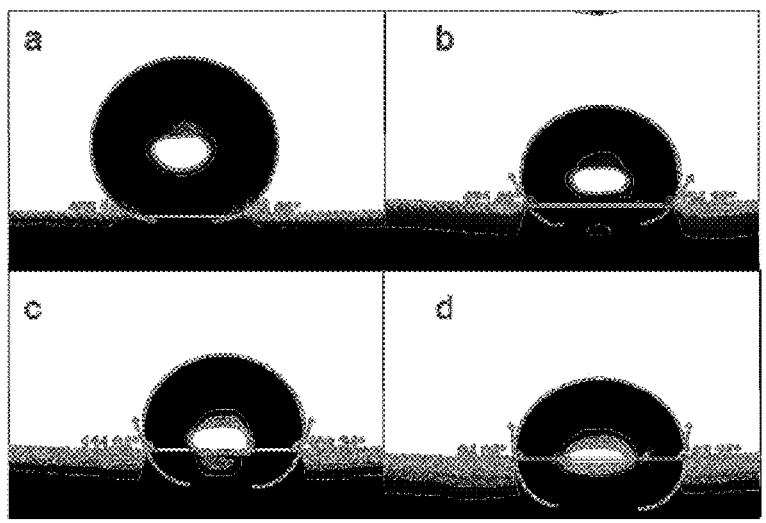
FIGS. 9A-9D depict (9A) water droplet profile on the micro-pillar structured surface of silicon wafer functionalized with TPI-Si, (9B) water droplet profile on the surface of silicon wafer functionalized with TPI-Si and after acetic acid dipping; (9C) water droplet profile on the surface of silicon wafer functionalized with TPI-Si and after hydrochloric acid dipping; and (9D) water droplet profile on the surface of silicon wafer functionalized with TPI-Si and after trifluoroacetic acid dipping.

After acid dipping, the wettability changes of TFS can be non-reversible. As shown in FIG. 8A, the static CA of a silicon wafer was initially around 55°. After the silicon wafer was functionalized with TPI-Si by the self-assembly approach, the CA of TFS was stabilized at 105° (FIG. 8B), which demonstrates the hydrophobicity of the surface. When the TFS was dipped in acetic acid for about 3 minutes, the CA of the surface decreased to around 95° and remained at around 95° two months later, shown in FIG. 8C. When the TFS was dipped in hydrochloric acid for about 5 seconds, the CA of the surface decreased to around 85° and remained at around 85° two months later, shown in FIG. 8D.

As shown in FIGS. 9A-9D, TFS with micro-pillar structures created different non-reversible wettabilities. After TPI-Si was used to functionalize the micro-pillar structured silicon substrate, the CA was permanently around 156°, shown in FIG. 9A. When TFS with micro-pillar structure was dipped in acetic acid for about 3 minutes, the CA of the surface decreased to around 123° and remained at around 120° two months later, shown in FIG. 9B. When TFS with micro-pillar structure was dipped in hydrochloric acid and trifluoroacetic acid for about 5 seconds, the CA of the surface decreased to around 110° and 94° respectively, shown in FIGS. 9C and 9D. The CA remained at around 110° and 94°, respectively, two months later.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:
1. A fluorescent compound for acid detection, wherein the compound is selected from the group consisting of:

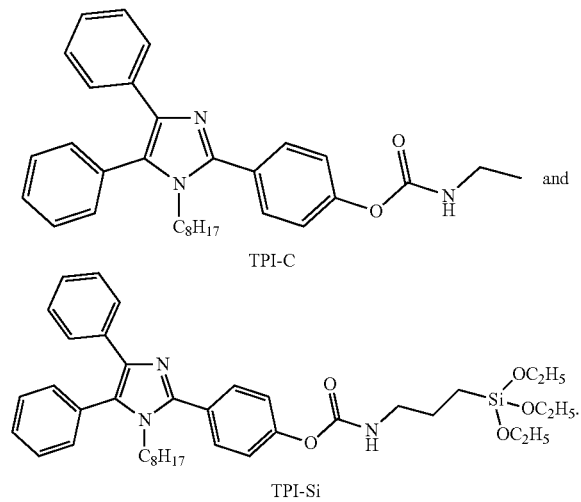

2. The compound of claim 1, wherein a fluorescent intensity emitted from the compound is enhanced from an original intensity level in the presence of an acid.

* * * * *